Feb. 12, 1952 N. MILLER 2,585,340
TEMPERATURE CONTROL DEVICE
Filed April 6, 1949
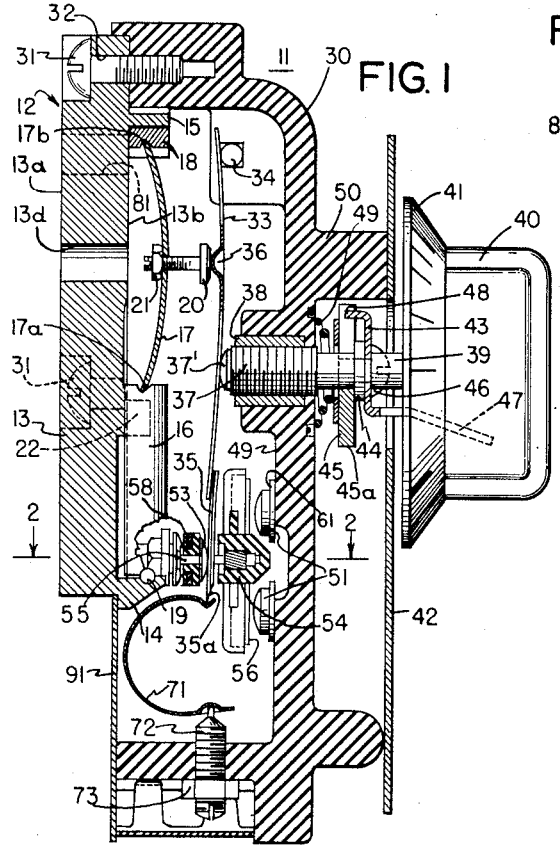
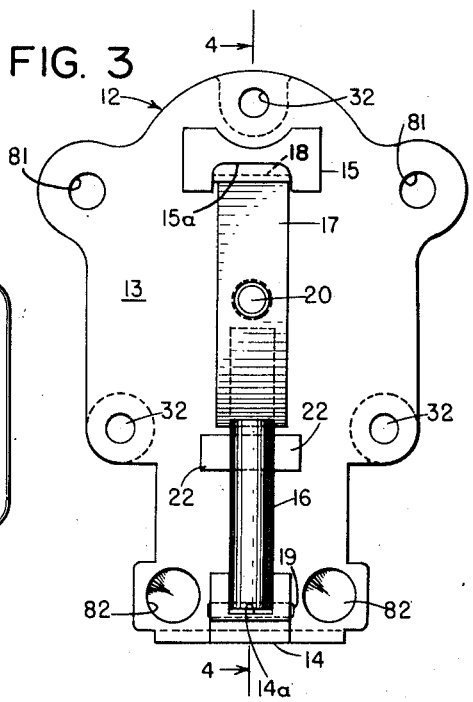
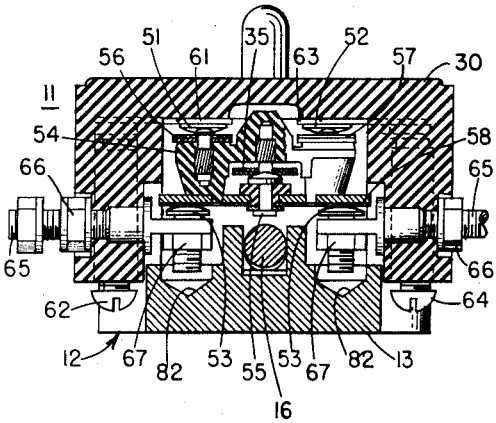
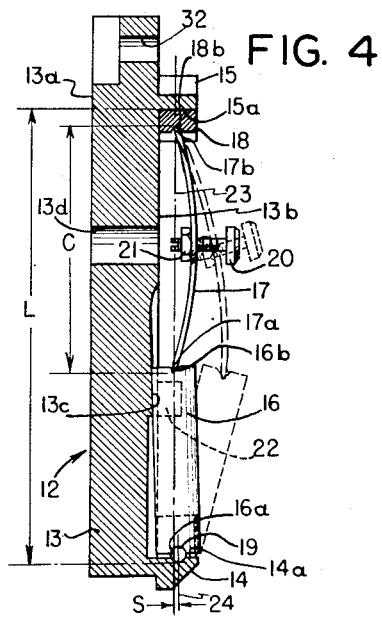
Inventor
Nicholas Miller
By
Smith, Olsen & Baird
Attys Patented Feb. 12, 1952

2,585,340

UNITED STATES PATENT OFFICE 2,585,340

TEMPERATURE CONTROL DEVICE

Nicholas Miller, Berwyn, Ill., assignor to Hotpoint Inc., a corporation of New York Application April 6, 1949, Serial No. 85,890

3 Claims. (Cl. 297—11)

1

The present invention relates to temperature control devices, and more particularly to thermal motors for operating such devices.

Although not limited thereto, the temperature control device of the present invention is especially useful in the automatic control of electric heating circuits employed in electric hot water heaters and the like, whereby the device responds to a temperature change in the tank of the hot water heater to open or to close electric contacts included in the electric heating circuits of the hot water heater in order to effect another desired temperature change in the tank. For example, the device may be employed to maintain a substantially constant predetermined temperature of the tank of the electric hot water heater.

A general object of the present invention is to provide an improved control device of the type noted that is simple, compact, rugged, readily assembled and relatively inexpensive to manufacture.

Another object of the invention is to provide in a control device of the type noted, an improved and exceedingly simple thermal motor for actuating a control member.

A further object of the invention is to provide a thermal motor of improved construction and arrangement in which the produced movement is the characteristic equivalent to that of a long temperature responsive element, but in which the limited elastic yield is the characteristic equivalent to that of a short temperature responsive element.

Further features of the invention pertain to the particular arrangement of the elements of the temperature control device and of the thermal motor, whereby the above-outlined and additional operating features thereof are attained.

The invention, both as to its organization and method of operation, together with further objects and advantages thereof, will best be understood by reference to the following specification taken in connection with the accompanying drawing, in which Figure 1 is a longitudinal sectional view of a temperature control device embodying the present invention; Fig. 2 is a transverse sectional view of the temperature control device, taken in the direction of the arrows along the line 2—2 in Fig. 1; Fig. 3 is a plan view of the thermal motor incorporated in the temperature control device shown in Figs. 1 and 2; and Fig. 4 is a longitudinal sectional view of the thermal motor, taken in the direction of the arrows taken along the line 4—4 in Fig. 3.

2

Referring now to the drawing the temperature control device 11 there illustrated, and embodying the features of the present invention, comprises a unitary thermal motor 12 including a relatively heavy rigid base 13 that is adapted to be secured in any suitable manner, not shown, to a hot water tank or other body, not shown, the temperature of which is to be controlled or regulated. In the event the base 13 is to be secured to the side wall of a substantially cylindrical body, the rear surface 13a thereof may be provided with a corresponding substantially cylindrical concavity, not shown, in order to insure a good fit and good thermal contact therebetween so that there is no substantial temperature gradient between the body and the base 13 and so that the temperature of the base 13 closely follows the temperature of the body. The base 13 extends longitudinally and carries two rigid longitudinally spaced-apart abutments 14 and 15 projecting forwardly from the front face 13b thereof.

Also, the thermal motor 12 comprises a longitudinally extending rigid bar 16, a longitudinally extending flexible and resilient element 17 and a rigid block 18 arranged in tandem relation between the abutments 14 and 15. More particularly, the bar 16 is of substantially cylindrical configuration, and the lower end thereof is arranged in a recess 14a provided in the abutment 14 and pivotally mounted upon a laterally extending substantially cylindrical pin 19 rigidly secured in place in aligned openings provided in the abutment 14 on opposite sides of the recess 14a, the extreme lower end of the bar 16 having a substantially semicylindrical groove 16a formed therein riding upon the outer cylindrical surface of the pin 19. The block 18 is arranged in a recess 15a formed in the abutment 15. The element 17 is of ribbon-like construction carrying knife edges 17a and 17b on the opposite ends thereof that are respectively received in cooperating laterally extending knife rests or grooves 16b and 18b respectively formed in the extreme upper end of the bar 16 and in the lower face of the block 18. The element 17 is maintained under compression between the upper end of the bar 16 and the lower face of the block 18 so that it is forwardly offset or arched between the knife edges 17a and 17b with respect to the front face 13b of the base 13. Further the central portion of the element 17 is provided with a threaded hole therein which receives the threaded shank of a forwardly projecting operating stud 20, the stud 20 being adjustable with respect to the element 17 and being locked in any adjusted position with respect to the element 17 by a lock nut 21 carried on the shank thereof. The front face 13b of the base 13 is provided with a longitudinally extending dished-out recess 13c therein that receives the upper end of the bar 16 and carries two laterally spaced-apart and forwardly projecting guide posts 22 disposed on opposite sides of the recess 13c and cooperating with the opposite sides of the upper end of the bar 16. Preferably the base 13, the abutments 14 and 15 and the guide post 22 are formed of integral one-piece die cast construction, whereby the base 13 is rigid between the abutments 14 and 15 and the guide posts 22 prevent lateral movement of the bar 16 while permitting longitudinal movement of the upper end thereof.

As illustrated in dotted lines in Fig. 4, after the pin 19 has been secured in place in the abutment 14 and the block 18 has been placed in the recess 15a provided in the abutment 15, the bar 16 and the element 17 are assembled in tandem relation between the pin 19 and the block 18, and consequently between the abutments 14 and 15. More particularly, the stud 20 is first secured in the opening provided in the mid-portion of the element 17 and locked in place by the nut 21 prior to assembly of the element 17 with the bar 16. The lower end of the bar 16 is then placed in the recess 14a provided in the abutment 14 with the groove 16a formed in the extreme lower end thereof riding upon the outer surface of the pin 19; and the knife edges 17a and 17b provided on the opposite ends of the element 17 are respectively positioned in the knife rest 16b formed in the extreme upper end of the bar 16 and in the knife rest 18b formed in the lower face of the block 18. The upper end of the bar 16 is then pressed inwardly toward the face 13b of the base 13, whereby the element 17 is buckled or arched between the knife edges 17a and 17b due to the resulting compression therein. Further pivoting movement of the bar 16 about the pin 19 toward the front face 13b of the base 13 causes the upper end thereof to snap over center with respect to the pin 19, whereby the upper end of the bar 16 enters into the recess 13c formed in the front face 13b and between the guide post 22, as illustrated in solid lines in Fig. 4. At this time the bar 16 occupies a stable position extending longitudinally upwardly toward the abutment 15 and inwardly toward the front face 13b of the base 13 and is securely retained in place in the recess 13c and between the guide post 22 due to the compression in the resilient element 17; and the element 17 is held under initial compression to retain the initial offset or arch therein between the knife edges 17a and 17b and forwardly with respect to the front face 13b of the base 13. At this time a plane indicated at 23 passes through the knife rests 16b and 18b lies substantially parallel to the front face 13b of the base 13 and spaced forwardly with respect thereto; while a substantially parallel plane indicated at 24 passes through the center of the pin 19 is disposed slightly forwardly with respect to the plane 23, the offset between the planes 23 and 24 being indicated by the distance S. This arrangement positively insures that the bar 16, the element 17 and the block 18 are restrained in stable assembled relation while permitting ready disassembly thereof, if required for purposes of inspection and adjustment, merely by following a procedure reversed from that described above.

Preferably the base 13 together with the abutments 14 and 15 and the guide posts 22 are formed of a stable aluminum alloy employing a die casting step; whereby the base 13 has a very high thermal coefficient of expansion. Preferably the pin 19, the bar 16, the element 17 and the block 18 are formed of "Invar," a nickel-steel alloy comprising approximately 36 to 40 per cent nickel and 60 to 64 per cent iron, whereby these parts have a very low thermal coefficient of expansion. In fact, for all practical purposes "Invar" has a thermal coefficient of expansion that is zero. Finally the operating stud 20 and the lock nut 21 may also be formed of "Invar," although this is ordinarily not necessary as brass or bronze are entirely satisfactory. As illustrated in Fig. 4 when the parts of the thermal motor 12 are at an ambient temperature the effective over-all length of the pin 19, the bar 16, the element 17 and the block 18 in longitudinal tandem relation is indicated by the distance L; and the effective cord length of the arched element 17 between the knife edges 17a and 17b is indicated by the distance C. Thus the base 13 over the distance L between the abutments 14 and 15 is formed of aluminum having a high thermal coefficient of expansion, while the parts 19, 16, 17 and 18 over the distance L between the abutments 14 and 15 are formed of "Invar" having a thermal coefficient of expansion of substantially zero. Accordingly, it is immaterial whether the parts 19, 16, 17 and 18 are arranged in good heat conducting relation with the base 13, since "Invar" has a thermal coefficient of expansion of substantially zero, and no consideration need be given to this aspect of the mounting arrangement of these parts with respect to the base 13.

Considering now the operation of the thermal motor 12 when the base 13 is at an ambient temperature the effective length of the base 13 between the abutments 14 and 15 is equal to the distance L and the cord length of the arched element 17 is equal to the distance C, whereby a predetermined initial offset is established in the element 17 with respect to the front face 13b of the base 13. Accordingly, when the base 13 is at the ambient temperature the extreme front face of the stud 20 is spaced a predetermined initial distance with respect to the front face 13b of the base 13 depending upon the initial adjustment of the stud 20 and the cooperating lock nut 21 in the threaded opening provided in the midportion of the element 17. Assuming that the lock nut 21 has been firmly set, the initial distance between the extreme front face of the stud 20 and the front face 13b of the base 13 is established at the ambient temperature of the base 13. Now when the base 13 is heated due to contact with the hot body, not shown, the temperature thereof increases above the ambient temperature, whereby the base 13 having a very high thermal coefficient of expansion expands in all directions. Fundamentally and primarily the base 13 expands in the longitudinal direction, whereby the longitudinal distance between the abutments 14 and 15 is substantially increased over the initial longitudinal distance L, relieving proportionately the compression exerted between the abutments 14 and 15 upon the pin 19, the bar 16, the element 17 and the block 18 arranged in tandem relation therebetween. At this time the temperature of the parts 19, 16, 17 and 18 is really not important as these parts have a thermal coefficient of expansion of substantially zero, although for convenience it may be assumed that the temperature of the parts mentioned fairly follows the temperature of the base 13. Since the parts 19, 16, 17 and 18 do not expand as the temperature thereof is increased, there is consequently a considerable reduction in the compression in these parts. Moreover, since the pin 19, the bar 16 and the block 18 are of rigid construction, this reduction in compression takes effect primarily in the flexible element 17, whereby the cord distance between the knife edges 17a and 17b is considerably increased over the initial cord distance C. Accordingly, the amount of offset or arch in the element 17 is considerably reduced, whereby the extreme front face of the stud 20 moves through a considerable distance toward the front face 13b of the base 13.

Conversely, when the base 13 is cooled as result of cooling of the hot body, not shown, the temperature thereof decreases toward the ambient temperature, whereby the base 13 contracts in all directions but fundamentally and primarily in the longitudinal direction decreasing the effective longitudinal distance between the abutments 14 and 15, whereby this longitudinal distance again approaches the initial longitudinal distance L, increasing proportionately the compression exerted upon the parts 19, 16, 17 and 18 disposed in tandem relation between the abutments 14 and 15. Since the parts 19, 16, 17 and 18 do not contract as the temperature thereof is decreased, there is consequently a considerable increase in the compression in these parts. Moreover, since the pin 19, the bar 16 and the block 18 are of rigid construction, this increase in compression takes effect primarily in the flexible element 17, whereby the cord distance between the knife edges 17a and 17b is considerably reduced toward the initial cord distance C. Accordingly, the amount of offset or arch in the element 17 is considerably increased, whereby the extreme front face of the stud 20 moves through a considerable distance away from the front face 13b of the base 13.

Of course, the changes in compression in the parts 19, 16, 17 and 18 as a result of the change in temperature of the base 13 is actually dependent upon the differential in the deformation in the base 13 between the abutments 14 and 15 and the deformation in the parts 19, 16, 17 and 18. However, this differential is substantially equal in fact to the deformation in the base 13 as the parts 19, 16, 17 and 18 are really not effectively expanded or contracted as a consequence of temperature changes over the entire response range of the thermal motor 12. Since the base 13 has a high thermal coefficient of expansion the initial longitudinal distance L is materially changed in response to variations in temperature in the base 13; and since the parts 19, 16 and 18 are of rigid construction, this change in the initial longitudinal distance L takes place effectively and directly in the initial cord distance C. These changes in the initial cord distance C cause a multiplied movement in the offset or arch in the resilient element 17. Accordingly, the thermal motor 12 has a temperature response characteristic, with respect to the lateral deflection of the arch producing the movement of the stud 20, which is equivalent to a long temperature responsive element of the length L, but obtaining this movement through the relatively short flexible member 17, which has the elastic yield characteristic equivalent to that of a short temperature responsive element of the length C. By transmitting these relatively great changes in the long distance L to the relatively short cord distance C a multiplication factor in the offset in the flexible element 17 between 1:4 and 1:10 may be readily obtained employing a construction of the general dimensions illustrated in the drawing. Hence, it will be understood that in response to a modest change in temperature in the hot body, not shown, the base 13 may expand over the distance L by approximately 0.001 inch producing a movement of the extreme front face of the stud 20 toward the front face 13b of the base 13 through a distance of as much as 0.010 inch. By increasing the length of one or both of the parts 16 and 18 the desired lateral movement of the stud 20 may be obtained while retaining the low elastic yield of the short arch. Thus it will be understood that the stud 20 may be utilized in order to actuate an electric switch or to control any other suitable device as explained more fully hereinafter.

The temperature control device 11 in the present illustration further comprises electric switch structure carried by the base 13 of the thermal motor 12, which electric switch structure is preferably substantially identical to that disclosed in United States Patent No. 2,260,014, granted on October 21, 1941, to Wallace J. Ettinger. More particularly, this switch structure comprises a substantially rectangular shaped casing 30 that is secured to the base 13 by a plurality of screws 31 extending through openings 32 provided in the base 13. The casing 30 may be made of any suitable insulating material, but is preferably made of a phenolic condensation product containing asbestos. Pivotally mounted within the casing 30 is a resilient operating member or arm 33, the operating member 33 extending longitudinally within the casing 30 and being disposed forwardly with respect to the parts carried by the base 13. Specifically, the upper end of the operating member 33 is attached to a pivot pin 34 carried by the casing 30; and the lower free end of the operating member 33 carries a short length of suitable bimetallic material or element 35 which serves as an ambient temperature compensating element in a well-known manner.

Provided in the operating member 33 adjacent to the fixed end thereof is a boss 36 that is engaged by the extreme front face of the stud 20 carried by the flexible element 17. The boss 36 and the stud 20 are arranged to be in engagement throughout the entire range of operation of the control device 11. In order to effect the initial adjustment of the stud 20 so as to bring it into engagement with the boss 36 the shank of the stud 20 is threaded into the hole provided in the midportion of the element 17 and is provided with a lock nut 21 as previously explained. Thus it will be understood that the movement of the stud 20 toward and away from the front face 13b of the base 13 is transmitted directly to the boss 36 in order to cause a corresponding deflection of the operating member 33 about the pivot pin 34.

In order to control the deflection of the operating member 33 so that it will perform a desired switching operation and in order to provide for adjustment of the temperature at which the operating member 33 performs its switching function, an adjustable screw 37 is provided which is threadedly supported in a sleeve 33 mounted in an opening provided in the front of the casing 30. The extreme rear end of the screw 37 is provided with a rounded portion 37' that is adapted to engage the operating member 33 at a point disposed intermediate the boss 36 and the free end of the operating member 33. The screw 37 is provided on a shaft 39 which is adapted to extend forwardly outside of the casing 30 and to receive a suitable control knob 40. The control knob 40 carries indicia 41 that cooperates with corresponding indicia provided on a front plate or cover 42 carried by the casing 30 in order to indicate the adjusted position of the temperature control device 11. To effect a positive drive connection between the knob 40 and the shaft 39 there is provided a disk 43 that surrounds the shaft 39 and lies between the knob 40 and a collar 44 formed integrally with the shaft 39. The drive connection between the disk 43 and the shaft 39 is obtained by a friction clamp formed by the disk 43, a plate 45 and a pair of screws 46, the parts mentioned being arranged tightly to grip the collar 44 therebetween. Provided on the disk 43 is a forwardly extending lug 47 inserted in the knob 40 to form the driving connection between the knob 40 and the disk 43. The plate 45 carries an outwardly projecting portion 45a that is adapted to engage a stud 50 carried by the casing 30 when the shaft 39 is rotated a predetermined amount in order to limit the movement of the screw 37 in either the clockwise or the counterclockwise directions. In order to prevent relative movement between the plate 45 and the disk 43 and to maintain a definite relation between these two parts, the plate 45 is slotted and a lug 48 carried by the disk 43 is inserted therein. Interposed between the plate 45 and the front wall of the casing 30 is a flattened coil spring 49, this spring 49 serving to take up any play in the threaded connection between the screw 37 and the sleeve 38 and to maintain the knob 40 in its adjusted position.

Considering the operation of the above-described construction, it will be apparent that rotation of the knob 40 will cause the rear end 37' of the screw 37 to be moved either closer to or farther from the operating member 33. Assuming that the screw 37 is rotated so that the rounded end 37' engages the adjacent portion of the operating member 33 and bears thereupon with a predetermined pressure, the expansion of the base 13 in accordance with an increase in temperature will cause the stud 20 to move toward the front face 13b of the base 13, whereby the operating member 33 will first pivot about the rounded end 37' of the screw 37 as a fulcrum, effecting an opposite deflection of the free end of the operating member 33, the free end of the operating member 33 being moved toward the right away from the front face 13b of the base 13 as viewed in Fig. 1. This deflection in the free end of the operating member 33 is utilized to perform a switch controlling function as explained hereinafter. Continued movement of the stud 20 toward the front face 13b of the base 13 as a consequence of further expansion of the base 13 further relieves pressure upon the boss 36, whereby the operating member 33 pivots further about the rounded end 37' of the screw 37. It is thus apparent that the position of the rounded end 37' of the screw 37 relative to the operating member 33 determines the temperature at which the device 11 performs its switching function.

As previously noted the device 11 is arranged to control the temperature of an electric hot water heater, or the like, and, accordingly, the operating member 33 controls switch structure comprising two pairs of front contacts 51 and 52 and one pair of rear contacts 53 with which an insulating bridging assembly 54 cooperates. More particularly, the bridging assembly 54 is operatively connected to the bimetallic element 35 just above the lower free end thereof by an arrangement comprising a stud 55. The front of the bridging assembly 54 carries two bridging contacts 56 and 57 respectively cooperating with the pairs of contacts 51 and 52; and the rear of the bridging assembly 54 carries one bridging contact 58 cooperating with the pair of contacts 53. The pair of front contacts 51 are respectively mounted upon a pair of substantially L shaped brackets 61 respectively terminating in a pair of terminal screws 62 disposed adjacent to one side of the base 13, the pair of contacts 51 being positioned adjacent to the interior of the front wall of the casing 30 on the one side thereof. The pair of front contacts 52 are respectively mounted upon a pair of substantially L shaped brackets 63 respectively terminating in a pair of terminal screws 64 disposed adjacent to the other side of the base 13, the pair of contacts 52 being positioned adjacent to the interior of the front wall of the casing 30 on the other side thereof. The pair of rear contacts 53 are respectively mounted upon a pair of terminal studs 65 respectively extending through the side walls of the casing 30 and secured in place by associated locking nuts 66. The insulating bridging assembly 54 is of the floating type to permit adjustment of the bridging contacts 56, 57 and 58 with respect to the associated pairs of contacts 51, 52 and 53. Also, the rear contacts 53 are provided with threaded shanks engaging threaded openings provided in the terminal studs 65 so that the positions thereof may be readily adjusted with respect to the associated bridging contact 58, whereby the rear contacts 53 constitute limiting stops for the insulating bridging assembly 54. Finally, the shanks of the rear contacts 53 carry lock nuts 67 so that the adjusted positions thereof may be maintained. Thus the switching structure is of the double throw type, the front of the switching structure being double pole and the rear of the switching structure being single pole.

In order to cause the switching structure to perform its switching function with a snap action the free end of the operating member 33 is subjected to an end thrust by a pivotally mounted U shaped spring 71, the spring 71 having a first arm bearing on a knife edge 35a provided on the extreme lower end of the bimetallic element 35 and having a second arm bearing on a fixed pivot 72. The pivot 72 comprises a stud that is threaded in an opening formed in the lower end wall of the casing 30, the stud 72 being adjustable and being retained in its adjusted position by an associated lock nut 73. This adjustment is a factory adjustment and is provided for the purpose of initially setting the end thrust so that the switching structure opens and closes the associated circuits with a good snap action.

When the base 13 is at the ambient temperature the stud 20 engages the boss 36 forcing the operating member 33 forwardly with respect to the front face 13b of the base 13 as previously noted, whereby the portion of the operating member 33 engaging the rounded end 37' of the screw 37 fulcrums thereon causing the bimetallic element 35 to be moved into its position toward the front face 13b of the base 13 and consequently moving the spring 71 into its left-hand position as viewed in Fig. 1, whereby the insulating bridging assembly 54 is moved toward the left as viewed in this figure. Thus at this time the bridging contact 58 establishes an electric circuit between the pair of rear contacts 53 and consequently between the terminal studs 65; and likewise the bridging contacts 56 and 57 respectively open the electric circuits between the pairs of front contacts 51 and 52 and consequently the respective electric circuits between the pairs of terminal screws 62 and 64.

Now when the temperature of the base 13 is increased the stud 20 moving toward the front face 13b of the base 13 releases the pressure exerted upon the boss 36, whereby the operating member 33 is fulcrumed about the rounded end 37' of the screw 37 as previously explained. More particularly, the free end of the operating member 33 and the bimetallic element 35 move away from the front face 13b of the base 13 and upon predetermined movement thereof the spring 71 moves the contact insulating bridging assembly 54 from its left-hand position shown in Fig. 1 into its right-hand position with a snap action. When the insulating bridging assembly 54 is thus snapped into its right-hand position, the bridging contact 58 opens the electric circuit between the pair of rear contacts 53, and the bridging contacts 56 and 57 respectively close the electric circuits through the pairs of front contacts 51 and 52. It will be understood that the electric circuit through the pair of rear contacts 53 may be included in the principal heating circuit of the body, not shown, associated with the base 13; while the electric circuits through the respective pairs of front contacts 51 and 52 may comprise auxiliary heating or control circuits associated with the body, not shown. In any case it is contemplated that when the electric circuit through the pair of rear contacts 53 is closed that the temperature of the body, not shown, will be materially increased, and that when the electric circuit through the pair of rear contacts 53 is opened that the temperature of the body will be materially decreased. Accordingly, the temperature control device 11 is effective to regulate the temperature of the body, not shown, with which the base 13 is operatively associated in accordance with the setting of the control knob 40. The base 13 may be directly secured in good heating exchange relation with the body, not shown, by any desired arrangement utilizing the holes 81 formed therein adjacent to the upper portion thereof. Also, in passing it is noted that two counter-bores 82 are formed in the lower portion of the base 13 in order to prevent engagement of the threaded shanks of the pair of rear contacts 53 with the base 13.

When the base 13 is secured to the body, not shown, the body, and, consequently, the control device 11, may be subjected to considerable variations in ambient temperature, and in order to prevent these variations in ambient temperature from producing fluctuations in the temperature at which the body, not shown, is governed by the control device 11, the bimetallic element 35 is provided. The element 35 may be formed of two strips of metal having dissimilar thermal coefficients of expansion welded together, the strips being formed of different nickel-chrome steel alloys, or the like. The bimetallic element 35 is so arranged that when the ambient temperature increases causing the base 13 to expand, the bimetallic element 35 will curve toward the left, as viewed in Fig. 1, so as to counteract the movement of the free end of the operating member 33 toward the right, as viewed in this figure. Conversely, upon a decrease in ambient temperature causing the base 13 to contract, the bimetallic element 35 will curve toward the right, as viewed in Fig. 1, so as to counteract the movement of the free end of the operating member 33 toward the left, as viewed in this figure. Accordingly, the bimetallic element 35 compensates the control device 11 against fluctuations in operation with reference to the setting of the control knob 40 resulting from variations in ambient temperature.

Finally, the control device 11 comprises a rear cover plate 91 closing the remainder of the rear of the casing 30 that is not closed by the base 13. Also, an opening 13d is formed through the base 13 in alignment with the threaded end of the operating stud 20 and the associated lock nut 21 permitting factory adjustment of the position of the stud 20 with respect to the flexible element 17 after the thermal motor 12 as a whole has been assembled with respect to the insulating casing 30.

In view of the foregoing it is apparent that there has been provided a temperature control device of improved construction and arrangement incorporating an improved and exceedingly simple thermal operating motor.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A thermal motor comprising a rigid base, two longitudinally spaced-apart rigid abutments carried by said base, one of said abutments having a laterally extending first notch formed therein, a laterally extending substantially cylindrical rigid pin arranged in said first notch, a longitudinally extending rigid bar having a laterally extending second notch formed in one end thereof and a first laterally extending knife-rest formed in the other end thereof, said second notch receiving and engaging said pin, a rigid block engaging the other of said abutments and having a second laterally extending knife-rest formed therein, a longitudinally extending flexible element terminating at the opposite ends thereof in first and second laterally extending knife-edges, said first and second knife-rests respectively receiving and engaging said first and second knife-edges and mounting said element under compression in order to produce an offset therein between said knife-edges, said base being formed of material having a high thermal coefficient of expansion and each of said pin and said bar and said block and said element being formed of material having a substantially zero thermal coefficient of expansion so that the differential between the deformation in said base between said abutments and the deformation in said pin and said bar and said block and said element between said abutments incident to a temperature change is effective to vary the compression in said element and consequently the offset therein between said knife-edges, and an operating member selectively governed in accordance with the offset in said element between said knife-edges.

2. The thermal motor set forth in claim 1, wherein said pin and said bar and said element and said block are normally retained in assembled relation between said two abutments by the compression in said element.

3. The thermal motor set forth in claim 1, wherein the junction between said first knife-rest and said first knife-edge is offset toward said base with respect to a line drawn between said first notch formed in said one abutment and said second knife-rest formed in said block, and said other end of said bar is in engagement with said base so that said pin and said bar and said element and said block are normally retained in assembled relation between said two abutments by the compression in said element.

NICHOLAS MILLER.

REFERENCES CITED

The following references are of record in the file of this patent:

UNITED STATES PATENTS

| Number    | Name       | Date           |
|-----------|------------|----------------|
| 1,501,019 | Lippincott | July 8, 1924   |
| 2,197,276 | Mulvany    | Apr. 16, 1940  |
| 2,248,666 | Fischer    | July 8, 1941   |
| 2,260,014 | Ettinger   | Oct. 21, 1941  |

FOREIGN PATENTS

| Number  | Country | Date         |
|---------|---------|--------------|
| 413,887 | France  | June 4, 1910 |